United States Patent

Budai et al.

[11] 3,904,628
[45] Sept. 9, 1975

[54] NOVEL CYCLOALKANOL FUMARATE ETHERS AND A PROCESS FOR THE PREPARATION THEREOF

[75] Inventors: Zoltan Budai; Laszlo Pallos; Lujza E. Petocz; Ibolya Kosoczky, all of Budapest, Hungary

[73] Assignee: Egyt Gyogyszervegyeszeti Gyar, Budapest, Hungary

[22] Filed: July 12, 1972

[21] Appl. No.: 271,001

[30] Foreign Application Priority Data
July 29, 1971  Austria .................................. 1932/71

[52] U.S. Cl. ...... 260/268 R; 260/611 R; 260/612 R; 424/250
[51] Int. Cl.² ........................................ C07D 295/00
[58] Field of Search ................................. 260/268 R

[56] References Cited
UNITED STATES PATENTS
3,254,083    5/1966   Stach .............................. 260/268 R

| | | |
|---|---|---|
| 3,330,831 | 7/1969 | English ............................ 260/268 R |
| 3,471,504 | 10/1969 | Satzinger ......................... 260/268 R |
| 3,634,498 | 1/1972 | Satzinger ......................... 260/268 R |
| 3,654,277 | 4/1972 | Winter ............................ 260/268 R |

FOREIGN PATENTS OR APPLICATIONS
1,209,567    1/1966   Germany ......................... 260/268 R

*Primary Examiner*—Donald G. Daus

[57] ABSTRACT

New cycloalkanol ethers of the general formula

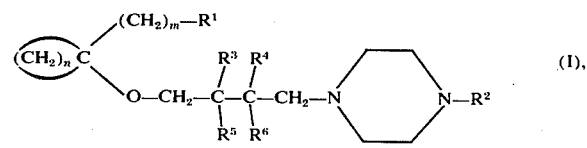

and their salts and quaternary derivatives were prepared.

2 Claims, No Drawings

NOVEL CYCLOALKANOL FUMARATE ETHERS AND A PROCESS FOR THE PREPARATION THEREOF

The compounds of the general formula (I) may be converted into their acid addition salts or quaternary derivatives. The obtained stereoisomeric compounds can be transformed into other stereoisomeric forms.

In the above formulas
$n$ is an integer of 4 to 7,
$m$ is an integer of 0 to 12,
$R^1$ stands for hydrogen, phenyl, monohalophenyl or dihalophenyl group,
$R^2$ stands for hydrogen, $C_{1-4}$ alkyl, $C_{1-4}$ hydroxyalkyl or trimethoxybenzoyloxy alkyl group,
$R^3$, $R^4$, $R^5$ and $R^6$ are hydrogen, or $R^3$ and $R^4$ and/or $R^5$ and $R^6$ may represent together a valence bond,
Hal stands for a halogen atom.

The new compounds of the general formula (I) possess valuable pharmacological properties. Among others, they have spasmolytic, central stimulating and appetite-decreasing effects.

This invention relates to novel cycloalkanol ethers of pharmaceutical effect and to pharmaceutical products containing the same, as well as to processes for the preparation thereof.

The novel compounds of the invention are represented by the general formula

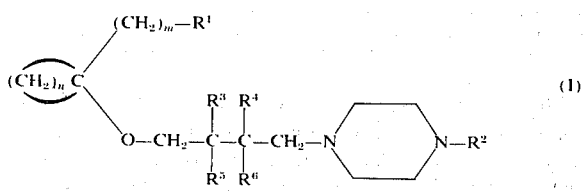

wherein:
$n$ is an integer of 4 to 7,
$m$ is an integer of 0 to 12,
$R^1$ stands for hydrogen, phenyl, monohalophenyl or dihalophenyl group,
$R^2$ stands for hydrogen, $C_{1-4}$ alkyl, $C_{1-4}$ hydroxyalkyl or trimethoxybenzoyloxy alkyl group,
$R^3$, $R^4$, $R^5$ and $R^6$ are hydrogen, or $R^3$ and $R^4$ and/or $R^5$ and $R^6$ may represent together a valence bond.

The salts and quaternary derivatives of the above compounds are also novel and fall also under the scope of the invention. The scope claimed encompasses all the possible stereoisomers and isomeric mixtures of the above compounds.

The novel compounds of the general formula (I) can be prepared according to the invention by several methods.

According to the method of the invention, an alcohol of the general formula

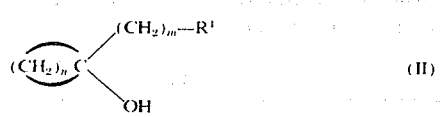

(prepared e.g. as described in J. Am. Chem. Soc. 70, 3352/1948/; Arzneimittelforschung, 12, 25/1962/, or J. Am. Chem. Soc. 78, 124/1956/), wherein $n$, $m$ and $R^1$ have the same meanings as defined above, is reacted in the presence of a basic condensing agent with a propargyl halide of the general formula

wherein Hal represents a halogen atom, and the obtained propargyl ether of the general formula

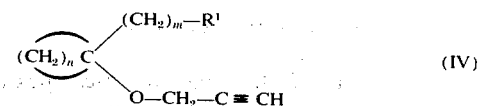

wherein $n$, $m$ and $R^1$ have the same meanings as defined above, is aminomethylated in the presence of a known piperazine derivative of the general formula

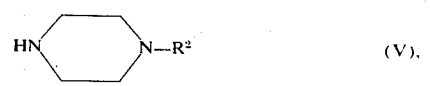

wherein $R^2$ has the same meanings as defined above. The thus-obtained compounds of the general formula (I), wherein $R^3$ and $R^4$, as well as $R^5$ and $R^6$ form together valence bonds, are isolated in the form of the free bases or their salts.

According to an other preferred method of the invention, an alcohol of the general formula (II), wherein $n$, $m$ and $R^1$ have the same meanings as defined above, is reacted in the presence of a basic condensing agent with a known piperazine derivative of the general formula

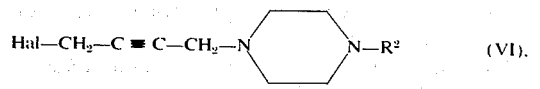

wherein Hal represents a halogen atom, and $R^2$ has the same meanings as indicated above.

As basic condensing agent preferably an alkali metal amide, e.g. sodium amide or an alkali metal hydride, e.g. sodium hydride can be used. The reaction can also be carried out in the presence of an alkali metal condensing agent, in this case, however, the reaction time is considerably long.

The propargyl halides of the general formula (III) are preferably the corresponding bromides or chlorides. Iodides can also be used, but their use is less advantageous.

The aminomethylation of the propargyl ethers having the general formula (IV) is preferably carried out in the presence of aqueous formaldehyde solution of paraformaldehyde.

According to a third process of the invention, a propargyl ether of the general formula (IV), wherein $n$, $m$ and $R^1$ have the same meanings as defined above, is reacted with equivalent amounts of a $C_{1-4}$ alkyl magnesium halide, the obtained compound of the general formula

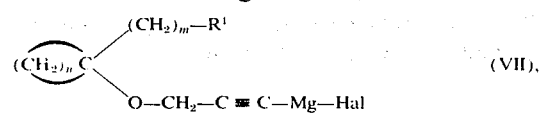

wherein n, m, R¹ and Hal have the same meanings as defined above, is reacted with formaldehyde, the obtained compound of the general formula

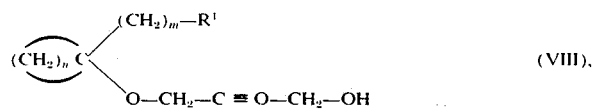

wherein n, m and R¹ have the same meanings as defined above, is converted into its reactive ester derivative, and the obtained reactive ester is aminated with a piperazine derivative of the general formula (V), wherein R² has the same meanings as defined above. In this step compounds of the general formula

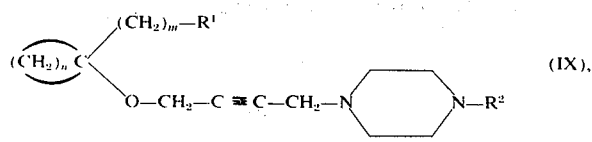

(i.e. compounds of the general formula (I), wherein R³ and R⁴ as well as R⁵ and R⁶ form together valence bonds) are obtained.

The compounds of the general formula (I), containing no unsaturation or one double bond in the side chain can be prepared by total or partial hydrogenation of the compounds of the general formula (IX). The partial hydrogenation of the compounds having the general formula (IX) can preferably be carried out with hydrogen in the presence of a partially poisoned catalyst. As catalyst, preferably palladium-on-carbon, partially poisoned with calcium bonate and lead acetate, can be used. The reaction is preferably conducted at room temperature and atmospheric pressure, in the presence of a solvent. Among the solvents, methanol is the preferred one.

The total hydrogenation of the compounds having the general formula (IX) can preferably be carried out with hydrogen, in the presence of a catalyst. As catalyst, peferably Raney nickel or palladium-on-carbon can be used.

The compounds of the general formula (I) can be converted into their pharmaceutically acceptable acid addition salts or quaternary derivatives, or the compounds obtained in the form of salts can be converted into the corresponding free bases. The individual stereoisomers of the compounds having the general formula (I) can be transformed into other isomers according to known techniques. E.g., the trans derivatives can be prepared from the corresponding cis compounds by ultraviolet irradiation in a solvent, e.g. in benzene.

The compounds of the general formula (I), as well as their pharmaceutically acceptable acid addition salts and quaternary derivatives can be converted into pharmaceutical products according to known techniques. The pharmaceutical products may contain the novel compounds as single active ingredients or together with other biologically active and/or synergistic agents. The pharmaceutical products are prepared by using the carriers and auxiliary substances generally usable for the preparation of such products.

The compounds of the general formula (I) possess valuable pharmacological properties. They have a strong effect in inhibiting nicotine spasm and nicotine lethality as well as phenothiazine catalepsy, and they exert a marked stimulating effect on the central nervous system. The novel compounds decrease the appetite to a great extent. They have also moderate antiserotonine, antiperistaltic and caolin oedema-inhibiting activities. Some of the novel compounds also inhibit the gastric secretion. Besides their favourable pharmacological properties, the toxicity of the new compounds is extremely low.

The toxicity data of some of the compounds according to the invention are listed in Table 1.

Table 1

| Compound (Example No.) | LD₅₀ mg./kg. i.p. | LD₅₀ mg./kg. p.o. |
| --- | --- | --- |
| 11 | 230 | — |
| 12 | 58 | 270 |
| 13 | 185 | 880 |
| 14 | 64 | 238 |
| 15 | 91 | 700 |
| 18 | 210 | above 1000 |
| 17 | 165 | — |
| 19 | 240 | above 1000 |
| 20 | 165 | — |
| 23 | above 1000 | — |
| 22 | 360 | about 500 |
| 16 | 70 | above 2000 |
| 21 | 250 | 1550 |
| Amphetamine | — | 25 |

Note: The toxicity of the compounds was examined on white mice. The LD₅₀ values were calculated on the basis of mortality observed within 48 hours.

The data relating to the stimulating effect of the new compounds (measured in motility tests) are summarized in Table 2. As reference compound, amphetamine was used. The tests were carried out on white mice of both sexes, using a Dews-apparatus. The compounds to be tested were administered orally. The increase of motility was expressed by the ED₃₀₀ values. ED₃₀₀ represents the dose which increases the number of light-interruptions in average to 300. The average number of light-interruptions observed in the control groups was 100 to 150.

Table 2

| Compound (Example No.) | ED₃₀₀ mg./kg. | Therapeutic Index |
| --- | --- | --- |
| Amphetamine | 3.3 | 7.6 |
| 12 | 10.5 | 25.7 |
| 14 | 5.6 | 42.5 |
| 15 | 30.0 | 23.3 |
| 22 | 3.3 | 7.6 |

As it is known from the literature, compounds of stimulating effect show a food-intake inhibiting activity in mice observed in corn-gnawing tests. The results of this test are summarized in Table 3. As reference compound, amphetamine was used.

Table 3

| Compound (Example No.) | ED₃₀₀ mg./kg. p.o. | Therapeutic Index |
| --- | --- | --- |
| Amphetamine | 2.8 | 8.9 |
| 12 | 12.0 | 22.5 |
| 14 | 39.0 | 6.1 |

The above compounds show stimulating and food-intake inhibiting activities also in rats.

The novel compounds show a long-lasting hypertensive action on narcotized cats, the degree of which depends on the actual sympathic tonus of the animals. The compounds potentiate also the pressor activity of noradrenaline.

Habituation (i.e. decrease in the motility-increasing activity) was not observed, when the compounds were administered orally into white mice for 3 weeks.

Some of the novel compounds show inhibiting activity in motility tests. The doses of compounds inhibiting the motility in 50 % are listed in Table 4.

Table 4

| Compound (Example No.) | Dose causing 50 % inhibition mg./kg. | Method of administration |
| --- | --- | --- |
| 11 | 33 | i.p. |
| 18 | 30 | i.p. |
| 17 | 30 | i.p. |
| 16 | 15 | i.p. |
| 21 | 270 | p.o. |

The spasmolytic activity of water-soluble compounds was investigated on isolated rat ileum, according to the Magnus method. The results are listed in Table 5.

Table 5

| Compound (Example No.) | Activity related to that of papaverine (=1) |
| --- | --- |
| 11 | 1.6 |
| 12 | 0.93 |
| 13 | 0.58 |
| 14 | 0.93 |
| 15 | 1.22 |
| 21 | 0.6 |

The spasmolytic activity of water-insoluble compounds was investigated on white mice, using the Stickney method. The results of this test, as well as the toxicity data of the compounds related to papaverine are summarized in Table 6.

Table 6

| Compound (Ex. No.) | Method of administration | dose mg./kg. | Inhibition % | Rel. toxicity |
| --- | --- | --- | --- | --- |
| 18 | s.c. | 30 | 47 | 0.54 |
| 17 | s.c. | 30 | 32 | 0.68 |
| 19 | s.c. | 30 | 32 | 0.47 |
| 20 | s.c. | 30 | 34 | 0.68 |
| Papaverine | s.c. | 75 | 62.5 | 1.00 |

The data relating to the evipan-narcosis stimulating effect of some compounds are listed in Table 7.

Table 7

| Compound (Ex. No.) | Method of administration | Dose causing 150 % increase in sleeping period, mg./kg. |
| --- | --- | --- |
| 13 | p.o. | 30 |
| 19 | i.p. | 30 |
| 21 | p.o. | 185 |

In the anticonvulsive tests, the compounds showed measurable activity only against nicotine in white mice. The results are The in Table 8. the data refer to the so-called tonus-convulsions.

Table 8

| Compound (Example No.) | Dose mg./kg. | Method of administration | Inhibition, % Nicotine convulsions | Nicotine lethality |
| --- | --- | --- | --- | --- |
| 12 | 10 | p.o. | 20 | 20 |
| 12 | 20 | p.o. | 100 | 30 |
| 13 | — | | | |
| 14 | 10 | p.o. | 0 | 0 |
| 15 | — | | | |
| 18 | 30 | i.p. | 50 | 60 |
| 17 | 30 | i.p. | 40 | 48 |
| 19 | 30 | i.p. | 58 | 64 |
| 20 | 30 | i.p. | 40 | 37 |
| 23 | 200 | i.p. | 60 | 60 |
| 22 | 30 | i.p. | 0 | 0 |
| 16 | 30 | i.p. | 20 | 20 |
| 21 | 30 | i.p. | — | 100 |

The anti-inflammatory activity of the compounds was investigated on rats, in kaolin edema test. The results are summarized in Table 9.

Table 9

| Compound (Example No.) | Dose mg./kg. | Method of administration | Inhibition % |
| --- | --- | --- | --- |
| 18 | 30 | i.p. | 42.3 |
| 18 | 15 | i.p. | 18.4 |
| 17 | 30 | i.p. | 37.0 |
| 17 | 15 | i.p. | 19.0 |
| 20 | 30 | i.p. | 24.5 |
| 20 | 15 | i.p. | 19.0 |
| 23 | 200 | i.p. | 22.0 |
| 22 | 60 | i.p. | 28.0 |
| 16 | 15 | i.p. | 18.0 |

The antiserotonine activity was investigated on white mice, using the Wooley method. The results measured on the active compounds are listed in Table 10.

Table 10

| Compound (Example No.) | $ED_{50}$ mg./kg. i.p. |
| --- | --- |
| 22 | about 50 |
| 16 | 21.0 |

It is to be mentioned that compounds having no stimulating effect, or possessing even a sedative activity, also decrease the appetite of the test animals, as shown by the data of Table 11.

The examinations were carried out on Vistar rats, by the Spengler-Waser method. The compounds to be tested were administered orally. As reference compound, chlorphentermine was used. The result was considered positive, if the food intake was lower than 5 g. during the 2 hours of examination. 5

Table 11

| Compound (Example No.) | dose mg./kg. | Positive results, % |
|---|---|---|
| Chlorphentermine | 5 | 0 |
| " | 10 | 39 |
| " | 20 | 50 |
| " | 40 | 80 |
| 18 | 25 | 0 |
| " | 50 | 20 |
| " | 100 | 75 |
| 16 | 25 | 0 |
| " | 50 | 40 |
| " | 100 | 50 |

As it turns out from the above data, the $ED_{50}$ values of the examined two new compounds are about 3.5 and 5 times higher, respectively, than that of chlorphentermine. It is to be mentioned, however, that the toxicity of the novel compounds is about 5.5 and 12 times lower, respectively, than that of the reference compound.

Finally it is to be mentioned that the end-product of Example 21 inhibits the gastric secretion in rats operated by the technique of Shay after 3 hours of pretreatment. The compound was administered in an oral dose of 100 mg./kg. The results are shown in Table 12.

Table 12

| Quantity of gastric juice | Free HCl | Total acidity |
|---|---|---|
| 48 % inhibition | 75 % inhibition | 51% inhibition |

The invention is further elucidated by the aid of the following, non-limiting Examples.

EXAMPLE 1

1-Dodecyl-1-(3'-propargyloxy)-cyclohexane 7.8 g. (0.2 moles) of finely powdered sodium amide and 60 ml. of abs. benzene are introduced into a 500 ml. three-necked flask equipped with a stirrer, addition funnell and reflux condenser. The stirrer is put into motion, a solution of 53.7 g. (0.2 moles) of 1-dodecyl-cyclohexane-1-ol in 60 ml. of abs. benzene is added dropwise to the mixture, then the reaction mixture is refluxed for 2 hours. Thereafter a solution of 25.96 g. (0.22 moles) of propargyl bromide in 50 ml. of abs. benzene are added drop-wise into the mixture, and the reaction mixture is refluxed for further 6 hours.

Thereafter the mixture is cooled to room temperature, washed with 2×50 ml. of water, the solvent is evaporated in vacuo, and the residue is fractionally distilled in vacuo. Yield: 46 g. (75 %). Bp.: 174°–178°C/0.6 mm.Hg. The product is a pale yellow oil.

EXAMPLE 2

1-(2',4'-Dichlorophenyl)-1-(3''-propargyloxy)-cyclohexane

The process described in Example 1 is repeated with the difference that 1-dodecyl-cyclohexane-1-ol is replaced by 49 g. (0.2 moles) of 1-(2',4'-dichlorophenyl)-cyclohexane-1-ol. The product is a slowly crystallizing, pale yellow, viscous oil. Yield: 42.4 g. (75.5 %). Bp.: 174°–178°C/6.5 mm.Hg.

EXAMPLE 3

1-(2',3'-Dichlorophenyl)-1-(3''-propargyloxy)-cyclohexane

One proceeds as described in Example 1, with the difference, that 1-dodecyl-cyclohexane-1-ol is replaced by 49 g. (0.2 moles) of 1-(2', 3'-dichlorophenyl)-cyclohexane-1-ol. The product is obtained with a yield of 34.5 g. (62.2 %). Bp.: 169°–174°C/7 mmg.Hg.

EXAMPLE 4

1-(3', 4'-Dichlorophenyl)-1-(3''-propargyloxy)-cyclohexane

One proceeds as described in Example 1, with the difference, that 1-dodecyl-cyclohexane-1-ol is replaced by 30 g. (0.122 moles) of 1-(3', 4'-dichlorophenyl)-cyclohexane-1-ol. The product is obtained with a yield of 23.3 g. (67.4 %). Bp.: 179°–184°C/6 mm.Hg.

EXAMPLE 5

1-(p-Chlorophenyl)-1-(3'-propargyloxy)-cyclohexane

One proceeds as described in Example 1, with the difference, that 1-dodecyl-cyclohexane-1-ol is replaced by 63.2 g. (0.3 moles) of 1-(p-chlorophenyl)-cyclohexane-1-ol. The product, a white crystalline substance, is obtained with a yield of 63.5 g. (85.8 %). Bp.: 160°–163°C/6 mmg.Hg. M.p.: 60°–61°C.

EXAMPLE 6

1-Benzyl-1-(3'-propargyloxy)-cycloheptane

One proceeds as described in Example 1, with the difference, that 1-dodecyl-cyclohexane-1-ol is replaced by 61.2 g. (0.3 moles) of 1-benzyl-cycloheptane-1-ol. The pale yellow, viscous product is obtained with a yield of 40.2 g. (33 %). Bp.: 156°–161°C/5.5 mm.Hg.

EXAMPLE 7

1-Benzyl-1-(3'-propargyloxy)-cylopentane

One proceeds as described in Example 1, with the difference, that 1-dodecyl-cyclohexane-1-ol is replaced by 49 g. (0.279 moles) of 1-benzyl-cyclopentane-1-ol. The pale yellow, viscous product is obtained with a yield of 40 g. (68 %). Bp.: 132°–140°C/6 mm.Hg.

EXAMPLE 8

1-Dodecyl-1-(3'-propargyloxy)-cyclohexane

One proceeds as described in Example 1, with the difference, that 4.6 g. (0.2 moles) of sodium dispersion is used in the preparation of the alcoholate in the place of sodium amide. The cessation of the hydrogen evolution indicates the termination of the reaction. The product is obtained with a yield identical to that described in Example 1. The physical data of the compound are also identical to that listed in Example 1.

EXAMPLE 9

1-Benzyl-1-[4'-(1'''-methyl-4''-piperazinyl)-butyn-(2)-yl-oxy]-cycloheptane difumarate 38.45 g. (0.1585 moles) of 1-benzyl-1-(3'-propargyloxy)-cycloheptane, 40 ml. of dioxane, 17.5 g. of N-methylpiperazine, 5.8 g. of paraformaldehyde and 0.3 g. of cupric acetate are introduced into a 250 ml. three-necked flask equipped with a stirrer and a reflux condenser. The mixture is stirred and refluxed for 3 hours, thereafter it is cooled to room temperature and poured into 200 ml. of water. The mixture is extracted three times with 100 ml. portions of benzene. The benzene solutions are combined, decolourized with carbon, filtered, and evaporated on a hot water bath. 48 g. (86.5 %) of the product are obtained.

The obtained base is reacted with calculated amount of fumaric acid to yield the fumarate salt, m.p.: 174.9 °C.

Analysis: $C_{31}H_{42}N_2O_9$.
Calculated %: C 63.46; H 7.21; N 4.77.
Found %: C 63.46; H 7.58; N 4.75.

EXAMPLE 10

1-Heptyl-1-(3'-propargyloxy)-cycloheptane

One proceeds as described in Example 1, with the difference, that 1-dodecyl-cyclohexane-1-ol is replaced with 42.4 g. (0.2 moles) of 1-heptyl-cycloheptane-1-ol. 38.4 g. (76.8 %) of a pale yellow, oily product are obtained. B.p.: 115°–120°C/0.3 mm.Hg.

EXAMPLE 11

Di-[1-heptyl-1-(4'-/1''-β-hydroxyethyl-4''-piperazinyl)-butyn-/2/-yl-oxy)-cyclohexane]-trifumarate One proceeds as described in Example 9, with the difference, that the following compounds are used as starting substances: 25 g. (0.1 moles) of 1-heptyl-1-(3'-propyloxy)-cycloheptane, 25 ml. of dioxane, 14.3 g. of N-β-hydroxyethyl-piperazine, 3.6 g. of paraformaldehyde and 0.2 g. of cupric acetate. 33.2 g. (84.6 %) of the base are obtained. The base is converted into its fumarate melting at 123°–125°C. Results of titration in non-aqueous medium:

base content: 98.9 %
acid content: 99.2 %

EXAMPLE 12

1-(p-Chlorophenyl)-1-[4'-(1''-β-hydroxyethyl-4''-piperazinyl)-butyn-(2)-yl-oxy]-cyclohexane monofumarate A mixture of 24.87 g. (0.1 moles) of 1-(p-chlorophenyl)-1-(3'propargyloxy)-cyclohexane, 25 ml. of dioxane, 14.3 g. of N-β-hydroxyethyl-piperazine, 3.6 g. of paraformaldehyde and 0.2 g. of cupric acetate is reacted as described in Example 9. 35 g. (90 %) of the base are obtained. The base is converted into its fumarate salt melting at 162.7°C.

Analysis: $C_{26}H_{35}ClN_2O_6$.
Calculated %: C 61.6; H 6.97; Cl 7.0; N 5.32.
Found %: C 62.0; H 7.1; Cl 7.2; N 5.38.

EXAMPLE 13

1-Benzyl-1-[4'-(1''-β-hydroxyethyl-4''-piperazinyl)-butyn(2)-yl-oxy]-cyclopentane monofumarate A mixture of 21.4 g. (0.1 moles) of 1-benzyl-1-(3'-propargyloxy)-cyclopentane, 25 ml. of dioxane, 14.3 g. of N-β-hydroxyethyl-piperazine, 3.6 g. of paraformaldehyde and 0.2 g. of cupric acetate is reacted as described in Example 9. 28.1 g. (77.9 %) of the free base are obtained. The fumarate salt melts at 137°C.

Analysis: $C_{26}H_{11}N_2O_6$.
Calculated %: C 65.38; H 8.65; N 5.86.
Found %: C 65.3; H 8.57; N 5.82.

EXAMPLE 14

1-(3', 4'-Dichlorophenyl)-1-[4'-(1''-β-hydroxyethyl-4''-piperazinyl)-butyn-(2) -yl-oxy]-cyclohexane difumarate A mixture of 23.3 g. (0.0823 moles) of 1-(3', 4'-dichlorophenyl)-1-(3''-propargyloxy)-cyclohexane, 25 ml. of dioxane, 11.8 g. of N-β-hydroxyethyl-piperazine, 2.96 g. of paraformaldehyde and 0.2 g. of cupric acetate is reacted as described in Example 9. 29.7 g. (85 %) of the free base are obtained. The fumarate salt melts at 198.5°C.

Analysis: $C_{30}H_{38}Cl_2N_2O_{10}$.
Calculated %: C 54.8; H 5.82; Cl 10.78; N 4.26.
Found %: C 54.54; H 5.99; Cl 10.9; N 4.4

EXAMPLE 15

1-(p-Chlorophenyl)-1-[4'-(1''-methyl-4''-piperazinyl)-butyn-(2)-yl-oxy]-cyclohexane difumarate A mixture of 24.8 g. (0.1 moles) of 1-(p-chlorophenyl)-1-(3'-propargyloxy)-cyclohexane, 25 ml. of dioxane, 11 g. of N-methyl-piperazine, 3.6 g. of paraformaldehyde and 0.2 g. of cupric acetate is reacted as described in Example 9. The free base is obtained with a yield of 32.6 g. (90.5 %). The fumarate melts at 184.3°C.

Analysis: $C_{29}H_{37}ClN_2O_9$.
Calculated %: C 58.73; H 6.29; Cl 5.97; N 4.72.
Found %: C 58.6; H 6.37; Cl 5.9; N 4.64.

EXAMPLE 16

Di-[1-dodecyl-1-(4'-/1''-β-hydroxyethyl-4''-piperazinyl/-butyn-/2/-yl-oxy)-cyclohexane]-trifumarate A mixture of 46 g. (0.15 moles) of 1-dodecyl-1-(3'-propargyloxy)-cyclohexane, 45 ml. of dioxane, 21.5 g. of N-β-hydroxyethyl-piperazin, 5.4 g. of paraformaldehyde and 0.3 g. of cupric acetate is reacted as described in Example 9. The free base is obtained with a yield of 54.3 g. (81 %). The fumarate melts at 136.4 °C.

Results of titration in non-aqueous medium:
base content: 99.7 %
acid content: 98.7 %

EXAMPLE 17

1-(2', 3'-Dichlorophenyl)-1-[4''-(1''-β-hydroxyethyl-4''-piperazinyl)-butyn-(2)-yl-oxy]-cyclohexane fumarate A mixture of 17.2 g. (0.0608 moles) of 1-(2', 3'-dichlorophenyl)-1-(3''-propargyloxy)-cyclohexane, 16 ml. of dioxane, 8.7 g. of N-β-hydroxyethyl-piperazine, 2.18 g. of paraformaldehyde and 0.15 g. of cupric acetate is reacted as described in Example 9. 21.1 g. (81.5 %) of the free base are obtained. The fumarate melts at 166°C.

Analysis: $C_{26}H_{34}Cl_2N_2O_6$.
Calculated %: C 54.8; H 5.82; Cl 10.78; N 4.26.
Found %: C 54.75; H 5.75; Cl 10.8; N 4.2.

EXAMPLE 18

1-(2',4'-Dichlorophenyl)-1-[4'-(1''-β-hydroxyethyl-4''-piperazinyl)-butyn-(2)-yl-oxy]-cyclohexane monofumarate A mixture of 11.8 g. (0.0418 moles) of 1-(2', 4'-dichlorophenyl)-1-(3''-propargyloxy)-cyclohexane, 11 ml. of dioxane, 1.5 g. of paraformaldehyde, 6 g. of N-β-hydroxyethyl-piperazine and 0.1 g. of cupric acetate is reacted as described in Example 9. The free base is obtained with a yield of 11 g. (61.5 %). The fumarate melts at 159.6°C.

Results of titration in non-aqueous medium:
base content: 99.1%
acid content: 98.7 %

EXAMPLE 19

1-Benzyl-1-[4'-(1''-methyl-4''-piperazinyl)-butyn-(2)-yl-oxy]-cycloheptane difumarate A mixture of 17.4 g. (0.812 moles) of 1-benzyl-1-(3'-propargyloxy)-cyclopentane, 20 ml. of dioxyne, 9 g. of N-methyl-piperazine, 2.92 g. of paraformaldehyde and 0.2 g. of cupric acetate is reacted as described in Example 9. The free base is obtained with a yield of 22.3 g. (83.5 %). The fumarate melts at 171.4°C.

Analysis: $C_{29}H_{38}N_2O_9$.
Calculated %: C 62.35; H 6.85; N 5.01.
Found %: C 62.37; H 6.94; N 5.0.

EXAMPLE 20

1-(p-Chlorophenyl)-1-/4'-(1''-β-hydroxyethyl-4''-piperazinyl)-butoxy]-cyclohexane difumarate 10 g. of 1-(p-chlorophenyl)-1-[4'-(1''-β-hydroxyethyl-4''-piperazinyl)-butyn-(2)-yl-oxy]-cyclohexane base (prepared as described in Example 12) are dissolved in 30 ml. of ethanol. 1 g. of palladium-on-carbon are added to the solution, and the mixture is hydrogenated at room temperature. When the hydrogen uptake ceases, the catalyst is removed by filtration, and the obtained base is converted to the difumarate preferably in the reaction medium itself. The fumarate salt melts at 191.3 °C.

Analysis: $C_{30}H_{43}ClN_2O_{10}$.
Calculated %: C 57.46; H 6.91; Cl 5.65; N 4.47.
Found %: C 57.52; H 7.1; Cl 5.75; N 4.51.

EXAMPLE 21

1-Benzyl-1-[4'-(1''-β-hydroxyethyl-4''-piperazinyl)-butyn-(2)-yl-oxy]-cycloheptane difumarate A mixture of 38.45 g. (0.1585 moles) of 1-benzyl-1-(3'-propargyloxy)-cycloheptane, 40 ml. of dioxane, 22.7 g. of N-β-hydroxyethyl-piperazine, 5.7 g. of paraformaldehyde and 0.31 g. of cupric acetate is reacted as described in Example 9. The free base is obtained with a yield of 47.9 g. (79 %). The fumarate melts at 181°C.

Analysis: $C_{32}H_{44}N_2O_{10}$.
Calculated %: C 62.31; H 7.19; N 4.54.
Found %: C 62.2; H 7.2; N 4.58.

EXAMPLE 22

Di-[1-(p-chlorophenyl)-1-(3'',4'',5''-trimethoxybenzoyl-4'-/1''-β-hydroxyethyl-4''-piperazinyl/-butyn-/2/-yl-oxy)-cyclohexane]-trifumarate 10 g. (0.0256 moles) of 1-(p-chlorophenyl)-1-[4'-(1''-β-hydroxyethyl-4''-piperazinyl)-butyn-(2)-yl-oxy]-cyclohexane (prepared as described in Example 12) are dissolved in 50 ml. of dichloroethane, and 5.93 g. of 3,4,5-trimethoxybenzoylchloride are added to the solution with stirring. After the addition is complete, the mixture is stirred at room temperature for 4 hours, thereafter it is washed with 20 ml. of saturated aqueous sodium carbonate solution. The solution is dried and evaporated to dryness in vacuo. The free base is obtained with a yield of 14.9 g. (98.5 %). The fumarate melts at 156.5°C.

Results of titration in nonaqueous medium:
base content: 98.5 %
acid content: 98.75 %

EXAMPLE 23

Di-[1-Benzyl-1-(3'',4'',5''-trimethoxybenzoyl-4'-/1''-β-hydroxyethyl-4''-piperazinyl/-butyn-/2/-yl-oxy)-cycloheptane]trifumarate.

A mixture of 10 g. (0.0261 moles) of 1-benzyl-1-[4'-(1''-β-hydroxyethyl-4''-piperazinyl)-butyn-(2)-yl-oxy]-cycloheptane (prepared as described in Example 21), 50 ml. of dichloroethane and 6.2 g. of 3,4,5-trimethoxybenzoylchloride is reacted as described in Example 20. The free base is obtained with a yield of 14.2 g. (94.5 %). The fumarate melts at 144.3°C.

Results of titration in nonaqueous medium:
base content: 100.1 %
acid content: 99.8 %

EXAMPLE 24

1-(p-Chlorophenyl)-1-[4'-(1''-methyl-4''-piperazinyl)-butyn-(2)-yl-oxy]-cyclohexane difumarate A solution of 21 g. (0.1 moles) of 1-(p-chlorophenyl)-cyclohexane-1-ol in 30 ml. of abs. benzene is added dropwise, with intensive stirring to a suspension of 3.9 g. (0.1 moles) of powdery sodium amide in 30 ml. of abs. benzene, and the mixture is refluxed for 2 hours. Thereafter a solution of 20.5 g. of 1-methyl-4-[4'-chloro-butyn-(2)-yl]-piperazine in 30 ml. of abs. benzene is added to the mixture, and the mixture is refluxed for further 6 hours. The resulting mixture is washed three times with 20 ml. portions of water, and evaporated to dryness in vacuo. 18.8 g. (52 %) of the free base are obtained as a residue. The fumarate melts at 184.3°C. The physical constants of the fumarate are identical to that indicated in Example 15.

EXAMPLE 25

Di-[1-dodecyl-1-(4'-/1''-β-hydroxyethyl-4''-piperazinyl/-butyn-/2/-yl-oxy)-cyclohexane] trifumarate A Grignard compound is prepared from 15.62 g. (0.11 moles) of methyl iodide and 2.68 g. (0.11 g.-atom) of magnesium in 150 ml. of abs. ether, thereafter a solution of 30.65 g. (0.1 moles) of 1-dodecyl-1-(3-propargyloxy)-cyclohexane in 50 ml. of abs. ether are added to the Grignard reagent. The reaction mixture is boiled until the gas evolution ceases, then 3 g. (0.1 moles) of trioxymethylene (or gaseous formaldehyde) are added to the mixture. The mixture is boiled for further 4 hours, then it is added to a solution of 10 g. of ammonium chloride in 40 ml. of ice water. The ethereal phase is separated, dried and evaporated. The oily residue is purified by vacuum distillation. The boiling point of the product is 202°C/0.6 mm.Hg. According to another method of purification, the crude product is reacted with a suspension of 3.9 g. (0.1 moles) of sodium amide in 60 ml. of abs. benzene, and when the ammonia evolution ceases, the mixture is cooled to a temperature below 20°C and 19 g. (0.1 moles) of tosyl chloride are added to it. The mixture is stirred for several hours at room temperature, thereafter it is washed successively with 30 ml. of water, 30 ml. of saturated aqueous sodium hydrocarbonate solution and again with 30 ml. of water. The benzene solution is dried, then 13 g. of N-β-hydroxyethyl-piperazine are added to it, and the mixture is heated to boiling. The mixture is washed with saturated aqueous sodium hydrocarbonate solution and with water, dried, and evaporated to dryness in vacuo. The product is obtained with a yield of 39 g. (87 %). The fumarate melts 136.4°136 °C. The product is identical to the compound obtained according to Example 16.

What we claim is:

1. A cycloalkanol ether of the formula

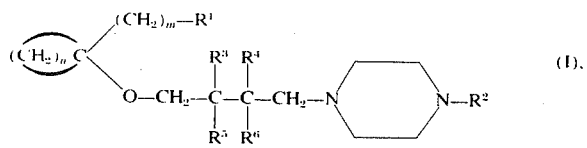

or a pharmaceutically acceptable salt thereof; wherein $n$ is an integer of 4 to 7, $m$ is an integer of 0 to 12, $R^1$ for hydrogen, phenyl, monohalophenyl or dihalophenyl group, $R^2$ stands for hydrogen, $C_{1-4}$ alkyl, $C_{1-4}$ hydroxyalkyl or trimethoxybenzoyloxy $C_{1-4}$ alkyl group, $R^3$ and $R^4$ and $R^5$ and $R^6$ each represent together a valence bond.

2. Di-[1-dodecyl-1-(4'-/1''-β-hydroxyethyl-4''-piperazinyl/-butyn-/2/-yl-oxy)-cyclohexane]-trifumarate according to claim 1.

* * * * *